June 11, 1963     B. BARÉNYI     3,093,405
SLIDABLE DOOR ARRANGEMENT IN MOTOR VEHICLES
Filed March 12, 1959     3 Sheets-Sheet 1
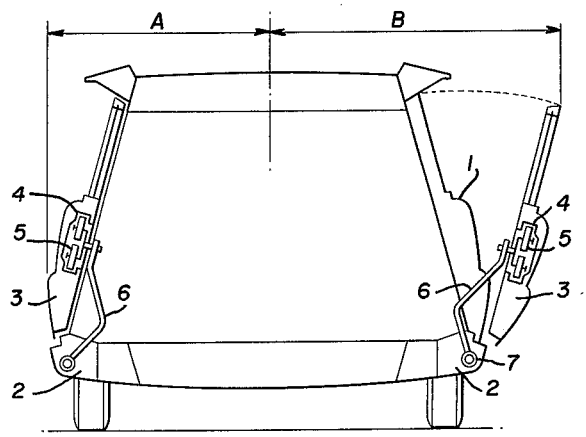
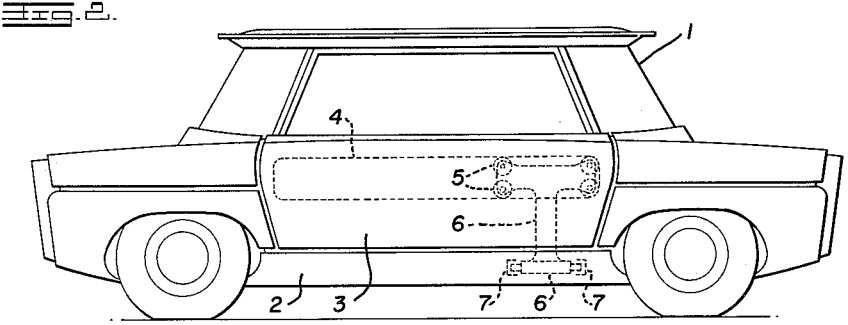
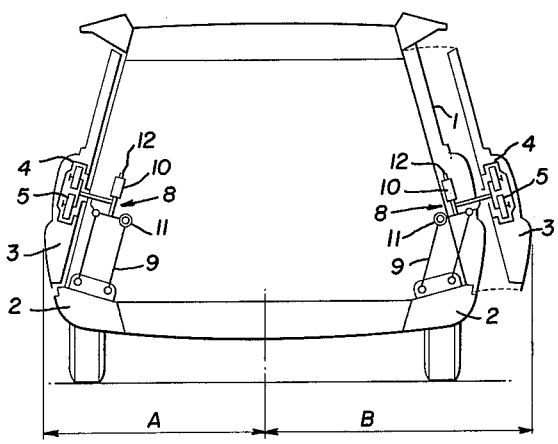
INVENTOR.
BÉLA BARÉNYI
BY Dicke, Craig and Freudenberg
ATTORNEYS

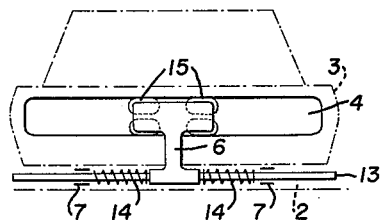
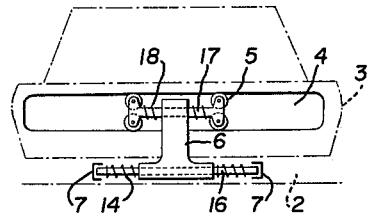
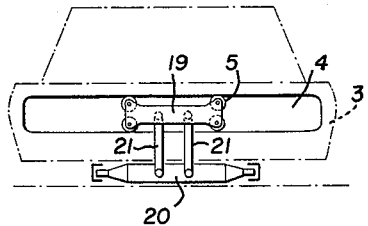
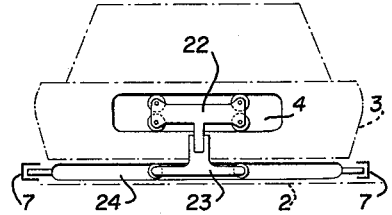
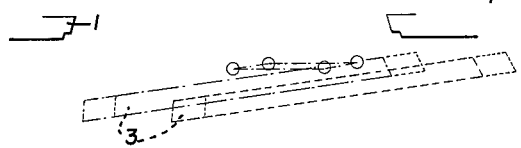
INVENTOR.
BÉLA BARÉNYI

June 11, 1963  B. BARÉNYI  3,093,405
SLIDABLE DOOR ARRANGEMENT IN MOTOR VEHICLES
Filed March 12, 1959  3 Sheets-Sheet 3
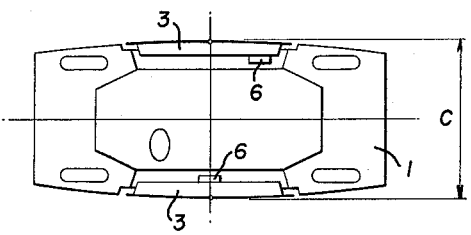
Fig. 9.
Fig. 10.
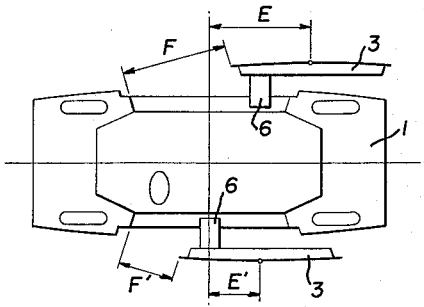
Fig. 11.
Fig. 12.
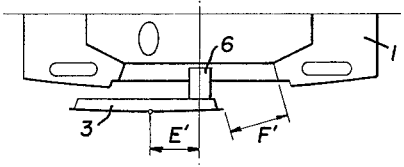
INVENTOR.
BÉLA BARÉNYI
BY Dicke, Craig and Freudenberg
ATTORNEYS 3,093,405
SLIDABLE DOOR ARRANGEMENT IN
MOTOR VEHICLES
Béla Barényi, Stuttgart-Vaihingen, Germany, assignor to
Daimler-Benz Aktiengesellschaft, Stuttgart-Unterturkheim, Germany
Filed Mar. 12, 1959, Ser. No. 798,882
Claims priority, application Germany Mar. 15, 1958
6 Claims. (Cl. 296—46)

The present invention relates to a slidable door arrangement in motor vehicles, and more particularly, to a slidable door arrangement of a passenger type motor vehicle.

Notwithstanding considerable disadvantages, the swinging-type door construction is still preferred as door construction in present-day motor vehicles.

Even though the disadvantage of the lateral enlargement of the vehicle contour during the opening of the door with a swinging-type door construction is avoided with a slidable door arrangement, difficulties exist to seal reliably the door gap in such slidable door arrangement. In order to achieve a reliable sealing, a door arrangement has already been proposed in the prior art in which the door is displaced transversely to the surface or area of the door aperture and is thereby lifted evenly by the sealing strip resiliently surrounding the same. This arrangement, however, results again in a further relatively large lateral displacement of the door during opening thereof.

The present invention is predicated on the problem of providing a slidable door arrangement, especially in the motor vehicles having a resilient seal between the door and the vehicle body in which the door carries out a combined movement during opening thereof.

The underlying problems are solved in accordance with the present invention by so constructing and arranging the slidable door that it may be liftable during opening thereof as a result of a pivotal or sliding movement transversely to the door aperture from the vehicle body into an intermediate position and to be adapted to be displaced in this intermediate position in the longitudinal direction of the vehicle within the guide arrangement provided therefor.

The present invention has the advantage that the gap between the door and the vehicle body is adapted to be sealed in a simple manner, more reliably than in the prior constructions and in such a manner as to change the lateral contours of the vehicle body only slightly during opening of the door. As compared to the known swinging-type door arrangements, the present invention additionally offers the advantage that the door is evenly pressed against the sealing strip during closure thereof and that the annoying and disturbing slamming of the door normally encountered during closure of swinging-type doors is completely eliminated thereby.

According to the present invention the slidable door arrangement may be appropriately so constructed that the door is suspended at least on one support arm which itself is secured at the frame of the vehicle, for example, at the longitudinal lateral bearer member so as to be pivotal about the longitudinal axis thereof. In connection therewith, the support arm may abut in the intermediate position of the door against a stop or abutment member, and, additionally, may be adapted to be fastened or secured between the two end positions thereof, for example, by means of springy abutments, in at least one intermediate position. This construction offers the advantage that the door may be lifted, by the swinging movement of the support arm, only a small distance from the vehicle body into a ventilating position thereof in which it releases a small ventilating gap along the entire periphery of the door. By the use of such a ventilating position the vehicle interior of the motor vehicle may be ventilated rapidly and very effectively.

In the place of the swinging movement of the door, a sliding movement may be used in an advantageous manner by the use of a four-corner guide arrangement operatively connecting the support arm with the frame of the vehicle. With both types of movements, i.e., with the pivotal and with the sliding movement, of the support arm, the movement thereof during opening and closing of the door may further be facilitated by providing a spring acting against the support arm and by so arranging the spring that the dead-center-position thereof lies between both end positions of the support arm as is known, for instance, in connection with so-called toggle-switch-type spring arrangements. If the support arm is arranged at a four-point or four-corner guide arrangement this spring may be arranged appropriately within the four-corner guide system itself.

A reliable guidance of the door may be achieved in accordance with the present invention by constructing the support arm in an essentially T-shaped manner and by supporting the guide members for the displacement of the door at the ends of the cross member of the T-shaped support arm. Possibly the longitudinal or vertical center leg member of the T-shaped support arm may consist also of two guide members arranged parallel to one another which are pivotal relative to one another in the direction of the guidance of the door so that the support arm may be additionally displaced in a parallel manner in the lateral direction thereof. With one preferred construction of tht present invention, the door may be suspended advantageously at the support arm at least approximately at the center of gravity thereof, and the guide rail for the displacement of the door may be arranged in that case approximately at one half the height thereof. In that connection the door in the intermediate position hereof may be displaced during opening and closing either only toward one side or toward both sides thereof. In the former case the support arm is arranged at one end of the door aperture and in the latter case in the center of the door aperture. In both cases the guide means for the door may be provided advantageously with a return spring which is loaded or compressed during opening of the door. Additionally, means of any suitable conventional construction may be provided by means of which the door is securely retained in the intermediate position or in one or both end positions thereof at the support arm.

A reliable support of the support arm at the vehicle frame may also be achieved in accordance with the present invention by constructing the end of the support arm, pivotally secured to the main frame, also in a T-shaped manner and by arranging the pivot bearings at the ends of the cross member of this T-shaped support arm end. The support arm may thereby be appropriately adapted to be displaced in a springy manner with respect to the pivot bearings thereof. Furthermore, the support arm may be advantageously connected with the guide members thereof in such a manner that the same are also appropriately adapted to be displaceable in a springy manner with respect to the support arm. Additionally, a lateral displaceability of the support arm may be achieved by making the support arm displaceable with respect to the vehicle frame in a guide-rail which is pivotally secured at the frame about an axis extending in the direction of the displacement thereof. Such guide arrangement may thereby also be equipped with return springs and/or spring-type detent means.

Particularly with an arrangement of the support arm in the center of the door aperture, the door in accordance with the present invention may be additionally pivotal about a vertical axis in the opened position thereof for purposes of increasing the door gap that is normally already rendered free during opening of the door. This may be made possible by constructing the support arm of an upper and of a lower part and by rendering the upper part at least in the intermediate position of the door pivotal with respect to the lower part. The upper part may thereby appropriately be supported with a pivot pin in a hollow pivot arm of the lower part so as to be rotatable through a predetermined angle.

The sliding door arrangement according to the present invention offers the possibility to arrange and/or construct the means for opening, closing and locking the door in a new and advantageous manner. For example, the handle of the door may be aranged at the support arm. For purposes of locking the door, a locking arrangement may also be provided between two parts of the support arrangement of the door that are pivotally connected with each other, i.e., the support arm of the four-corner guide arrangement, whereby the actuating means for the locking arrangement may be arranged at the handle. If the support arm is arranged at the four-corner or four-point guide arrangement, then the locking means may be appropriately so arranged that it effectively locks with each other two of the leg portions of the four-cornered guide arrangement.

According to the present invention the slidable door arrangement may be advantageously so constructed that the door is moved at least partly automatically with the aid of any suitable conventional drive arrangement. For example, one drive arrangement each, especially with an electrice motor, may be provided for the pivotal movement of the support arm and the sliding movement of the door. Each drive arrangement may thereby appropriately be equipped with a limit switch and an engaging switch located at the dash port or steering wheel of the vehicle and at the outer wall of the door. Possibly the automatic movement of the door may be limited to the longitudinal displacement thereof while a sliding arrangement, for example, an electric motor with a belt drive, a chain drive, a toothed rack or the like may be installed for the transverse sliding movement of the door which are adapted to be engaged by means of the handle of the door. In both cases installations may be provided which enable selectively the movement of the door either by the auxiliary drive arrangements or manually. For example, for that purpose a free-wheeling installation, for example, a slip clutch may be provided between the electric motor of each drive arrangement and the force-transmitting connecting members thereof.

Accordingly, it is an object of the present invention to provide a sliding door arrangement which eliminates the disadvantages of the prior art constructions.

It is another object of the present invention to provide a sliding door construction for motor vehicles which is simple in construction and effective in operation, and which reduces to a minimum the increase in the lateral contours of the vehicle during opening of the door.

Still another object of the present invention resides in the provision of a sliding door arrangement which makes possible an effective and reliable seal between the door and vehicle body, which permits effective ventilation of the vehicle interior space, and which eliminates the slamming of doors during closure thereof.

These and other objects, features and advantages of the present invention will become more obvious from the following description when taken in connection with the accompanying drawing which shows for purposes of illustration only several embodiments in accordance with the present invention and wherein—

FIGURE 1 is a schematic cross sectional view of a motor vehicle provided with a sliding door arangement in accordance with the present invention which is suspended at a pivotal support arm, FIGURE 2 is a schematic side view of the door arrangement of FIGURE 1, FIGURE 3 is a schematic cross sectional view through a modified embodiment of a sliding door arrangement in accordance with the present invention in which the support arm is in a form of a four-point guide-link arrangement.

FIGURES 4 through 7 are partial schematic side views of four further modifications of the sliding door arrangement in accordance with the present invention.

FIGURE 8 is a partial schematic plan view of the sliding door arrangement of FIGURE 7 and, FIGURES 9 to 12 are schematic top plan views of two embodiments of sliding door arrangements in accordance with the present invention showing the doors in three respective positions thereof.

Referring now to the drawing wherein like reference numerals are used throughout the various views to designate like parts, and more particularly to FIGURES 1 and 2, reference numeral 1 designates therein the vehicle body of a passenger motor vehicle constructed in any suitable appropriate manner and provided with longitudinally extending lateral bearer members 2. A door 3 is provided on each side of the vehicle body. A seal, for example, a rubber strip or a strip made of synthetic material of any suitable construction, and therefore not shown in detail herein, is provided between the door 3 and the vehicle body 1 which seal surrounds the door 3 preferably with the same cross section over the entire periphery thereof and which may be arranged and secured either at the vehicle body 1 or at the door 3. With all embodiments described herein, a guide-rail 4 is provided within the door 3 on the inside thereof at about half the height of the door 3 while guide members 5 in a form of individual or pairs of rollers or ball members or combinations thereof are displaceably arranged and guided in the guide-rail 4.

In the embodiment illustrated in FIGURES 1 and 2 the sliding door arrangement is provided with a support arm 6 pivotally secured in any suitable manner on each side of the vehicle body 1 to a respective longitudinal bearer member 2 which support arm 6 has the shape of a double-T or I and may be angularly shaped as viewed from the side thereof, i.e., as viewed in FIGURE 1. The upper cross member of this T-shaped support arm 6 carries at the ends thereof the guide members 5. The lower cross member of the T-shaped support arm 6 is supported with the ends thereof in any suitable conventional bearings 7, possibly in resilient intermediate bearing members, the lower cross member and bearings constituting pivotal means for mounting an arm.

In the embodiment according to FIGURE 3, two T-shaped support arms generally designated by reference numeral 8 are secured by means of a four-corner or four-point guide-link system 9, at the longitudinal bearer members 2, for example, exclusively by means of a pair of bolts. The joints of the system may be constructed in a springy manner. The guide members 5 are again arranged at the end of the upper cross member of each support arm 8. The bolts with their respective mountings constitute pvotal means for supporting the respective arms 8.

Each support arm 8 is provided with a handle 10 which is arranged, for example, in such a manner that it extends upwardly at an inclination. A locking arrangement constructed in any suitable manner may be provided within the joint 11 of the four-point guide-link system 9 by means of which two link members of the four-point guide-link system 9 pivotally connected with each other may be locked with one another to thereby lock the door. For purposes of actuating the locking arrangement an actuating knob 12 may be provided at the handle 10.

With both slidable door arrangements, the doors 3 are supported during opening and closing thereof by the support arms 6 and 8. With the arrangement according to FIGURE 1, the doors 3 are at first pivoted during opening thereof about the horizontal axis of the support arm 6 outwardly into the intermediate position thereof, shown in the right half of FIGURE 1 and are thereby lifted off the door seal. After the lateral movement of the door 3 the same is displaced in the longitudinal direction of the vehicle until one pair of the guide members 5 abuts against the end of the guide-rail 4 or an abutment suitably provided therefor. The largest width of the vehicle body 1 with a closed door is indicated in FIGURE 1 by the distance A whereas the distance B indicates the largest width of the vehicle with the door opened. A comparison of these two dimensions A and B with those normally obtained with swinging type doors clearly shows that the largest width B in accordance with the present invention remains considerably smaller with the opened door.

The slidable door arrangement according to FIGURE 3 differentiates itself with respect to the door movement of the embodiment of FIGURES 1 and 2 by the fact that the door for purposes of opening is displaced at first parallel to the surface or plane of the door aperture in the lateral direction of the vehicle into the intermediate position thereof, illustrated in the right half of FIGURE 3. During this movement, the door 3 is also lifted off the door seal. Following the parallel movement in the lateral direction, the door 3 is thereupon again displaced in the longitudinal direction of the vehicle as indicated hereinabove.

A comparison of the largest width B of the vehicle body of FIGURE 3 with the door thereof opened clearly indicates that with this construction the difference between the body width in the opened and closed door positions of the vehicle is still further reduced.

With both embodiments of FIGURES 1 and 3 in accordance with the present invention, the opening and closing of the door may be facilitated by means of springs which act on the support arms 6 and 8 in such a manner that the dead center positions thereof are disposed between the two end positions of the support arm. Since such arrangements which function in the manner of a toggle switch are well known in the prior art, a further description and illustration thereof is dispensed with herein.

In the embodiment according to FIGURE 3, the spring providing such dead center position may be appropriately so arranged within the four-point guide-link system 9 that the forces thereof which may be considerable over certain parts are effective therewithin. The lifting of the door 3 from the vehicle body 1 is limited in any appropriate manner by abutments against which the support arm 6 in the case of the FIGURE 1 embodiment or arms 8 or the four-point guide-link systems 9 of the FIGURE 3 embodiment abut in the intermediate position of the door 3. For example, an abutment may be provided on the flange member above the bearer 2 so as to be contacted by the lower end of one of the guide link elements of the system 9 when the door is the intermediate position shown on the right hand side of FIGURE 3. Furthermore, additional springy or disengageable abutments such as spring-loaded detents may be provided by means of which the door may be selectively secured in any desired ventilating position in which the door 3 releases a more or less large ventilating gap between itself and the vehicle body 1.

In the embodiment illustrated in FIGURE 4 the support arm 6 is arranged in the center of the door aperture, however, the support arm is thereby so arranged within bearings 7 at the longitudinal bearer member 2 that the pivot axis 13 is adapted to be axially displaced in both directions within bearings 7 against the effect of two springs 14. The guide members (not shown in detail in FIGURE 4) arranged at the support arm 6 are constructed, for example, as rows of ball members which are each arranged within housings 15.

In the embodiment according to FIGURE 5, the support arm 6 is also disposed in the center of the door aperture and is also adapted to be displaced in a longitudinal direction toward both sides with respect to bearings 7 thereof. In this case, the displaceability, however, is achieved by making the support arm 6 displaceable on the pivot shaft 16 against the effect of springs 14. The support arm 6 is also displaceable with respect to the guide members 5. This is achieved by an arrangement whereby the guide members 5 are mounted on a cross beam or shaft 17 which is adapted to be displaced or slidable in the upper end of the support arm 6 against the effect of two springs 18.

The particular characteristic of the embodiment of FIGURE 6 consists in arranging the guide members 5 of the support arm at a cross bearer 19 which is pivotally connected with a longitudinal pivot shaft 20 by means of two essentially vertical struts or supports 21 pivotally secured at both ends thereof. This construction of the support arm enables a large deflection of the opened door 3 in the direction of the sliding guide arrangement. Appropriate return springs may also be provided in the joints of both connecting struts or supports 21 which tend to return the support arm into the normal center position thereof.

In the embodiment according to the present invention of FIGURES 7 and 8, the support arm consists of a T-shaped upper part 22 and also of a T-shaped lower part 23 which are connected with each other in such a manner that the upper part 22 with the door opened is adapted to be pivoted in the lower part 23 within certain angular limits about an approximately vertical axis. This pivotal movement is clearly visible in FIGURE 8, and more particularly this movement may take place in the intermediate position of the door 3 as well as in the end position of the opened door.

In connection with this embodiment, a further possibility of movement of the support arm is made feasible by the fact that the lower part 23 is rendered displaceable in any suitable manner in the longitudinal direction thereof within a guide-rail 24 suitably arranged at the longitudinal bearer member 2, appropriately against the effect of return springs (not shown). The guide-rail 24 is thereby pivotally supported at the longitudinal bearer 2 within bearings 7 about the longitudinal axis thereof.

In FIGURES 9 to 12, the individual steps or stages which take place during the opening of the door 3 with the slidable door arrangement according to the present invention are illustrated, and more particularly in the upper half of each of these figures, the support arm 6 or 8 is arranged at one end of the door aperture preferably at the rear end thereof whereas in the lower half of each of these figures the support arm 6 is arranged in the center of the door aperture. These dispositions of the support arm 6 are also exemplary of the dispositions of the corresponding arms 8 of FIGURE 3. It is understood, of course, that in ordinary vehicles the slidable door arrangement is normally of the same type on both sides of the vehicle though actual constructions such as shown schematically in FIGURES 9 through 12 are also feasible and may offer certain advantages, as will be quite obvious from the following considerations.

The width of the vehicle with a closed door is shown in FIGURES 9 and 10 by the dimension C and the width thereof with an opened door with dimension D. A comparison of these two dimensions C and D in FIGURE 10 indicates that the difference therebetween is only very slight.

In FIGURE 10 both doors 3 are illustrated in the intermediate position thereof. This is the position in which the support arm 6 or 8 has terminated its pivotal or sliding movements and abuts against a stop member whereas the sliding movement of the door 3 in the longitudinal direction thereof has not yet begun.

Additional so-called ventilating positions of the door 3 are possible between the closed door position of FIGURE 9 and the intermediate position thereof illustrated in FIGURE 10.

The end position of the fully opened door 3 is illustrated in FIGURES 11 and 12. As may be readily seen from the upper half of FIGURE 11, the unilateral arrangement of the support arm 6 or 8 previously referred to produces a relatively large distance E traversed by the door 3 during the longitudinal displacement thereof in the longitudinal direction and therewith also a relatively large ingress aperture F. With the centrally disposed arrangement of the support arm 6 or 8, the distance E' traversed by the door 3 during sliding movement thereof and the ingress aperture F' are smaller. However, the door 3 may be displaced in that case in both directions and thereby is adapted to open up both the front and rear boarding apertures F' (FIGURES 11 and 12).

The movements of the doors 3 from the closed position (FIGURE 9) over the intermediate position thereof (FIGURE 10) into the fully opened end position (FIGURES 11 and 12) with an opened door and vice-versa back to the fully closed position may be realized, either partly or completely, with the aid of suitable auxiliary devices and arrangements, and may be appropriately controlled from the dash-board or the steering wheel of the motor vehicle. The drive arrangements may thereby appropriately be so constructed that the doors may be moved also manually independently of these auxiliary arrangements, for example, by the interposition of suitable freewheeling devices.

While I have shown and described several embodiments in accordance with the present invention, it is understood that the same is not limited thereto but is susceptible of many changes and modifications within the spirit and scope of the present invention and I, therefore, do not wish to be limited to the details illustrated and described herein but intend to cover all those changes and modifications as are encompassed by the scope of the appended claims.

I claim:

1. A sliding door arrangement, particularly for motor vehicles having a vehicle body provided with at least one door aperture and a fixed vehicle part positioned below said door aperture, a sliding door normally closing said door aperture, support means for supporting said door in an open position consisting essentially exclusively of a single support arm assembly having an upper end and a lower end, essentially longitudinal pivot means to pivotably secure said lower end of said support arm assembly to said fixed vehicle part to enable a first movement of said door from a closed position thereof in the transverse direction of the vehicle away from said door aperture, guide means connected to said upper end of said support arm assembly and pivotable therewith, and complementary guide means secured to the inside of said door and cooperating with said first-mentioned guide means to enable a second movement of said door essentially in the longitudinal direction of the vehicle, the above-enumerated support means being positioned within the interior of said vehicle body in the closed position of said door.

2. A sliding door arrangement according to claim 1, wherein said support arm means is of essentially T-shape and includes a cross member and a center leg portion, and said guide means being carried at the ends of the cross member of said T-shaped support arm for guiding said door in said guide means during displacement thereof in the longitudinal direction.

3. A sliding door arrangement according to claim 1, wherein said complementary guide means includes a guide rail for the longitudinal displacement of said door disposed in said door at approximately one half the height thereof.

4. A sliding door arrangement according to claim 1, wherein said guide means includes return spring means spring-loaded during movement of said door thereby urging said door to return to a predetermined position.

5. A sliding door arrangement according to claim 1, wherein said complementary guide means includes roller members and wherein said support arm is resiliently displaceable relative to said roller members.

6. A sliding door arrangement according to claim 1, wherein said support arm means essentially consists of an upper part and of a lower part, and wherein said upper part together with said door is pivotal relative to said lower part in said intermediate position.

References Cited in the file of this patent

UNITED STATES PATENTS

| | | |
|---|---|---|
| 1,339,790 | Salladay | May 11, 1920 |
| 1,813,553 | Van Dorn | July 7, 1931 |
| 2,445,131 | Wartian | July 13, 1948 |
| 2,589,493 | Henry | Mar. 18, 1952 |
| 2,774,998 | Kiekert | Dec. 25, 1956 |
| 2,844,849 | Kelly | July 29, 1958 |

FOREIGN PATENTS

| | | |
|---|---|---|
| 698,436 | France | Nov. 18, 1930 |
| 717,071 | France | Oct. 13, 1931 |
| 876,967 | France | Aug. 24, 1942 |
| 457,337 | Italy | May 15, 1950 |
| 859,117 | Germany | Dec. 11, 1952 |